United States Patent
Narula et al.

(10) Patent No.: US 12,455,839 B1
(45) Date of Patent: Oct. 28, 2025

(54) SYSTEM AND METHOD OF AUTOMATICALLY ONBOARDING A PERIPHERAL DEVICE TO A PLURALITY OF HOST INFORMATION HANDLING SYSTEMS VIA A PREVIOUSLY PAIRED GATEWAY PERIPHERAL DEVICE

(71) Applicant: Dell Products LP, Round Rock, TX (US)

(72) Inventors: Harpreet S. Narula, Austin, TX (US); Kai Leong Wong, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 6 days.

(21) Appl. No.: 18/647,871

(22) Filed: Apr. 26, 2024

(51) Int. Cl.
*G06F 13/10* (2006.01)
*H04W 76/14* (2018.01)

(52) U.S. Cl.
CPC .......... *G06F 13/102* (2013.01); *H04W 76/14* (2018.02)

(58) Field of Classification Search
CPC .............................. G06F 13/102; H04W 76/14
USPC ......................................................... 710/62
See application file for complete search history.

(56) References Cited

U.S. PATENT DOCUMENTS

| 11,576,100 | B2 | 2/2023 | Choi |
| 2002/0147816 | A1 | 10/2002 | Hlasny |
| 2006/0129679 | A1 | 6/2006 | Hlasny |
| 2014/0219193 | A1 | 8/2014 | Linde |
| 2015/0031288 | A1* | 1/2015 | Tubbesing ............... H04B 5/72 455/41.1 |
| 2018/0007499 | A1 | 1/2018 | Lee |
| 2018/0069726 | A1 | 3/2018 | Ohhira |
| 2020/0022198 | A1* | 1/2020 | James ................... H04R 1/1091 |
| 2020/0128394 | A1* | 4/2020 | Han ........................ H04W 8/28 |
| 2020/0344608 | A1 | 10/2020 | Duo |
| 2021/0076163 | A1 | 3/2021 | Burowski |
| 2021/0227391 | A1 | 7/2021 | Duo |
| 2021/0307085 | A1* | 9/2021 | Pavlou .................... G06F 21/85 |

(Continued)

FOREIGN PATENT DOCUMENTS

| EP | 1344339 A1 | 9/2003 |
| EP | 1344339 B1 | 5/2015 |

*Primary Examiner* — Christopher B Shin
(74) *Attorney, Agent, or Firm* — Prol Intellectual Property Law, PLLC; H. Kenneth Prol

(57) ABSTRACT

A peripheral device operatively couplable to a plurality of information handling systems may comprise a microcontroller to execute code instructions of a gateway automated wireless pairing module stored on a storage device storing Bluetooth® Low Energy (BLE) host addresses for the information handling systems detecting hotkey activation of the peripheral device to coordinate trusted pairing of a subordinate wireless peripheral device to each of the information handling systems and to copy clone extended directed generic attribute (GATT) communication profile metadata, a wireless radio transmitting to the subordinate wireless peripheral device each of the BLE host addresses and instructions to pair with each of the information handling systems, via extended directed GATT communications established using the BLE host addresses, and the wireless radio to transmit to the subordinate wireless peripheral device and to each of the information handling systems, via extended direct GATT communication mode, seed values for generation of pairing credentials.

20 Claims, 4 Drawing Sheets

(56) References Cited

U.S. PATENT DOCUMENTS

| | | |
|---|---|---|
| 2021/0337360 A1 | 10/2021 | Burowski |
| 2022/0030403 A1* | 1/2022 | Peng .................... H04W 76/11 |
| 2022/0210735 A1 | 6/2022 | Narula |
| 2022/0377553 A1* | 11/2022 | Lee ...................... H04L 9/0841 |
| 2023/0308976 A1* | 9/2023 | Chan .................... H04W 36/18 |
| 2023/0362645 A1 | 11/2023 | Duo |
| 2024/0028144 A1* | 1/2024 | Park .................... G06F 3/03545 |

* cited by examiner

SYSTEM AND METHOD OF AUTOMATICALLY ONBOARDING A PERIPHERAL DEVICE TO A PLURALITY OF HOST INFORMATION HANDLING SYSTEMS VIA A PREVIOUSLY PAIRED GATEWAY PERIPHERAL DEVICE

FIELD OF THE DISCLOSURE

The present disclosure generally relates to a system to operatively couple a new peripheral device to an information handling system. The present disclosure more specifically relates to a system and method to automatically pair a new peripheral device to a plurality of information handling systems via an existing wireless peripheral device that has been previously paired to each of the plurality of information handling systems, acting as a gateway peripheral device to instruct pairing of the new peripheral device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications, or gaming applications or the like. Further, the information handling system may include a radio to operatively couple or pair one or more peripheral devices to the information handling system for use with the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
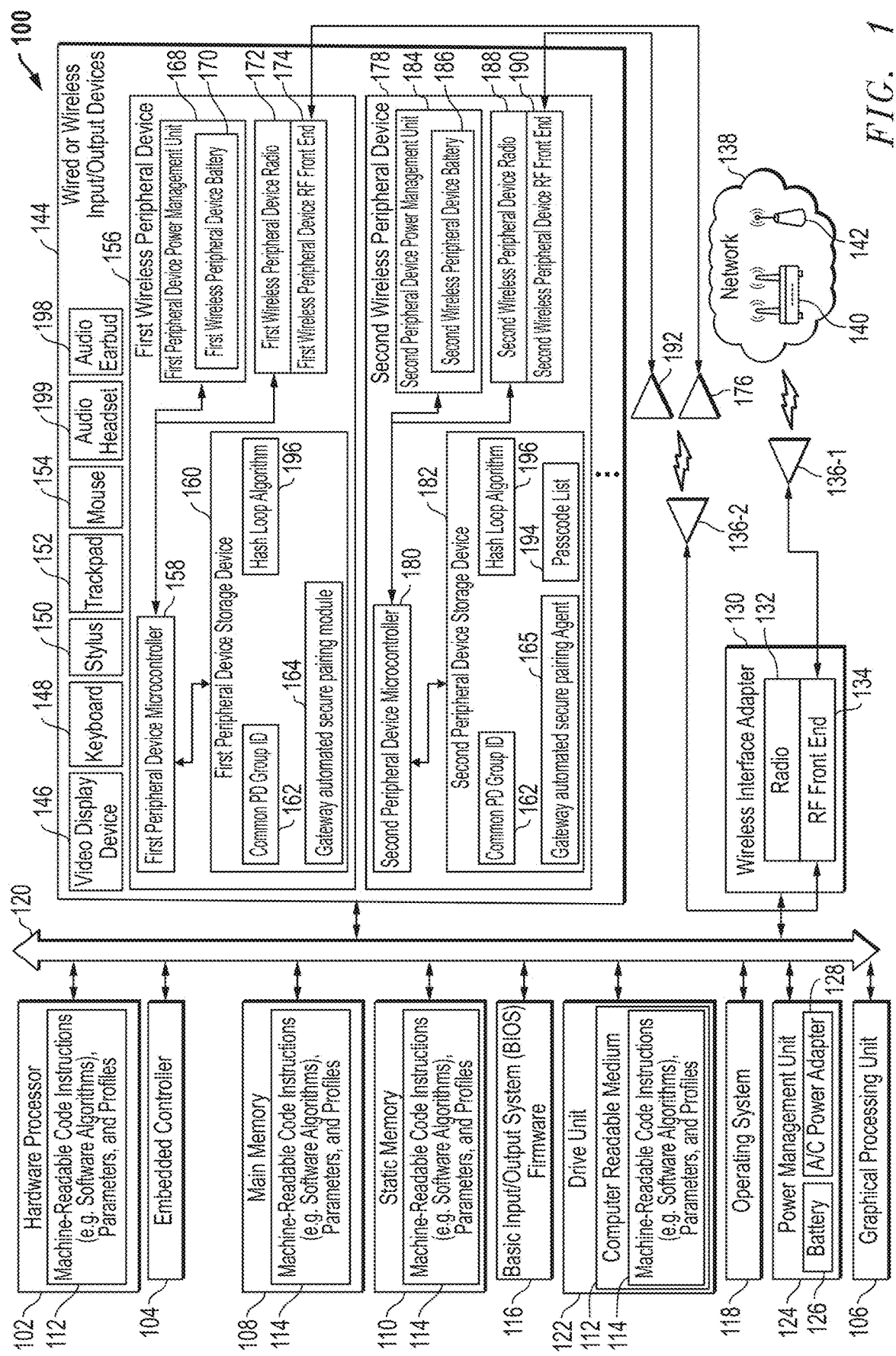
FIG. 1 is a block diagram illustrating an information handling system that may be operatively coupled to a first wireless peripheral device and a second wireless peripheral device with one of the first and second wireless peripheral devices acting as a gateway peripheral device for pairing the other peripheral device according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may be operatively coupled to a peripheral device that allows the user to interact with the information handling system. These peripheral devices may include a mouse, a keyboard, a video display device, a stylus, a trackpad, and the like that allows a user to provide input to the information handling system and receive output from the information handling system. These peripheral devices may be wirelessly couplable to the information handling system through the use of various radio frequency (RF) radios in the information handling system and the peripheral device. This operative coupling may include an initial step of pairing the peripheral device to the information handling system, for example under Bluetooth® or Bluetooth® Low Energy (BLE) standards of wireless communications. Current pairing processes may include initiation or turning on the information handling system and peripheral device and initiating an initial communication such that confirming pairing data may be exchanged between the peripheral device and information handling system. This process must be repeated for each information handling system (e.g., work laptop, home desktop, gaming laptop) with which the user wishes to use the new peripheral device. One current pairing process includes having a user confirm a pin or other alphanumeric code on a display device of, for example, the information handling system to achieve a security standard level for the pairing. However, without the ability to input this code, this pairing process using a displayed alphanumeric code would not work. This occurs in "headless peripheral devices" that do not include these input capabilities or have other input capabilities that do not allow for input of the alphanumeric. In order to overcome this, these headless peripheral devices may be hard coded or include in a data storage device the alphanumeric code that is exchanged automatically between the peripheral device and the information handling system. Similarly, with smart devices that include, for example, its own hardware processing device such as a microcontroller, a random number generator may be provided to generate this alphanumeric code or other code that is exchanged between the peripheral device and the information handling system. However, this process only works for peripheral devices that have input capabilities that allow for this input. In the case where a plurality of information handling systems must pair separately with each newly added or newly purchased peripheral device, this process may be cumbersome.

The present specification describes a gateway automated secure pairing system and method for pairing a newly purchased or newly added wireless peripheral device to a plurality of information handling systems to reduce required user participation in pairing processes across the plurality of information handling systems for the newly added wireless peripheral device. The embodiments of the present specification remove requirements of entering pin codes at such newly added wireless peripheral devices, for example, according to embodiments herein. This may occur in embodiments herein due to an existing wireless peripheral device that is currently paired with and in direct communication with one of the plurality of information handling systems at a secure Bluetooth® Low Energy (BLE) host address specific to one of the plurality of previously paired information handling systems that has been previously paired with the existing wireless peripheral device and is trusted in embodiments herein based on sharing access of a directed, secured communication with the host information handing system with the newly added wireless peripheral device using secure extended directed generic attribute profile (GATT) communication at a BLE host address specific to the first information handling system. Thus, the existing wireless peripheral device directs and instructs the pairing process between the newly added wireless peripheral device and each of the information handling systems that have been listed as having been previously paired to the existing wireless peripheral device.

In an embodiment, the existing wireless peripheral device currently paired to a first information handling system in a list of previously paired information handling systems to which the newly purchased peripheral device may be paired may execute computer-readable program code of a gateway automated wireless pairing module to determine that the existing wireless peripheral device has been hotkey activated by a user providing a specific combination of user inputs to act as a gateway peripheral device to direct pairing of a newly added subordinate wireless peripheral device with the first information handling system. The existing wireless peripheral device currently paired to the first information handling system may then assume a role as a gateway peripheral device to orchestrate pairing of the newly added subordinate wireless peripheral device with the first information handling system using seed values generated at the gateway peripheral device and transmitted to both the first information handling system via the secure extended directed generic attribute profile (GATT) communication at the BLE host address specific to the first information handling system and to the newly purchased or added subordinate wireless peripheral device. Further, the BLE host address specific to the first information handling system is transmitted to the newly added subordinate wireless peripheral device. With the seed values and the first information handling system's secure BLE host, address, the newly added subordinate wireless peripheral device may generate matching pairing credentials, keys, or passcodes in direct communication of Bluetooth® or BLE pairing process via the extended directed GATT communication at the BLE host address.

In an embodiment, the user of an existing wireless peripheral device may execute a hotkey actuation to activate a hardware processor such as a microcontroller to execute computer-readable program code of a gateway automated wireless pairing module to prepare to clone extended directed GATT communication profile metadata of the existing wireless peripheral device for use with the newly added and not yet paired peripheral device in an embodiment. The existing wireless peripheral device will reconnect to a first host information handling system it has previously paired with if not actively wirelessly coupled already. The microcontroller to execute computer-readable program code of a gateway automated wireless pairing module at the existing wireless peripheral device will prepare the clone extended directed GATT communication profile metadata which may include a passcode seed, BLE host address for pairing with the first information handling system, a group ID that identifies both the existing wireless peripheral device and the newly added wireless peripheral device as part of a recognized group of peripheral devices that may be identified for a user, and device ownership data of ownership of the existing wireless peripheral device in an embodiment. The group ID and ownership of the existing and newly added wireless peripheral devices may be previously loaded or added upon purchase or provisioning of the existing wireless peripheral device and the newly added wireless peripheral device by an information technology decision maker (ITDM) of an enterprise, a user, or by a manufacturer identifying a purchase of both the existing and newly added wireless peripheral devices. The clone extended directed GATT communication profile metadata may be provided from the existing wireless peripheral device to the newly added wireless peripheral device via GATT communication and with a GATT copy process to the newly added wireless peripheral device.

In an embodiment, the newly added and not yet paired peripheral device may also execute computer-readable program code of a gateway automated wireless pairing agent to determine that the newly added wireless peripheral device has been hotkey activated by a user. The hotkey execution at the newly added wireless peripheral device provides another specific combination of user inputs to act as a subordinate wireless peripheral device to the gateway peripheral device to receive pairing instructions and a BLE host address for pairing with the first information handling system at the BLE host address with a secured extended directed GATT communication link. The newly added wireless peripheral device not yet paired to the information handling system may then assume a role as a subordinate wireless peripheral device to the gateway peripheral device to await receipt of the clone extended directed GATT communication profile metadata from the existing wireless peripheral device.

Then the newly added wireless peripheral device may establish an extended directed GATT communication with the first wireless peripheral device using the clone extended directed GATT communication profile metadata from the existing wireless peripheral device as extended trust to the newly added wireless peripheral device. Upon establishing the extended directed GATT communication link, the newly added wireless peripheral device will conduct verification of pairing credentials, keys, passcodes, or other pairing requirements and instructions from the seed value provided by the existing wireless peripheral device acting as the gateway device to pair with the first information handling system using the secure BLE host address. In this way, the pairing communication is secure from any other nearby potential host information handling systems from interfering because the secure BLE host address is used. A similar process may be used by the newly added subordination peripheral device that has received additional clone extended directed GATT communication profile metadata from the existing gateway peripheral device to pair with other information handling systems at other secure BLE host addresses with which the gateway existing wireless peripheral device is previously paired in other embodiments.

In an embodiment, the newly added subordinate wireless peripheral device and each of the host information handling systems may independently generate identical pairing passcodes or credentials using the received seed values and verify the same via the BLE host addresses for those host information handling systems via a secured extended directed GATT communication link. The subordinate wireless peripheral device may first pair with a first information handling system to which the gateway peripheral device is currently operatively coupled. Based on confirmed identical pairing passcodes on both sides, verification or confirmation and, in some embodiments, acceptance of pairing is transmitted between the first information handling system at the secure BLE host address specific to that first information handling system and the newly added subordinate wireless peripheral device which received the secure BLE host address for the first information handling system and other information handling systems that have previously paired with the gateway peripheral device from the gateway peripheral device. Upon each powering on of the gateway peripheral device and the subordinate wireless peripheral device in embodiments herein, this process may be repeated with other host information handling systems to which the gateway peripheral device has been previously paired until the subordinate wireless peripheral device has paired with each of the host information handling systems to which the gateway peripheral device has previously paired. This allows a secure automatic pairing of the subordinate pairing peripheral device to each of the host information handling systems to which the gateway peripheral device has previously paired while minimizing or negating user participation or input in these processes.

Turning now to the figures, FIG. 1 illustrates an information handling system 100 similar to the information handling systems according to several aspects of the present disclosure. The information handling system 100 may be one of a plurality of information handling systems to which any number of peripheral devices 156, 178, 146, 148, 150, 152, and 154 may pair. One of these peripheral devices 156, 178, 146, 148, 150, 152, or 154 may act as a gateway peripheral device (e.g., 156) to direct pairing of another of the peripheral devices (e.g., 178, 146, 148, 150, 152, or 154) to each of a plurality of information handling systems, including 100. Such a gateway first wireless peripheral device (e.g., 156) may execute code instructions of a gateway automated secure pairing module 164 to securely direct pairing of another subordinate second wireless peripheral device (e.g., 178, 146, 148, 150, 152, or 154) to the plurality of information handling systems, including 100, to reduce user participation in pairing processes across the plurality of information handling systems, including 100, when each newly added wireless peripheral device (e.g., 178, 146, 148, 150, 152, or 154) is to pair with a plurality of information handling systems. The gateway first wireless peripheral device (e.g., 156) may execute code instructions of a gateway automated secure pairing module 164 along with the subordinate second wireless peripheral device 178 executing code instructions of a gateway automated secure pairing agent 165 to remove or reduce the requirements of a user entering pin codes for such newly added wireless peripheral devices (e.g., 178, 146, 148, 150, 152, or 154) and expedite pairing.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, or any combination thereof. Additional components of the information handling system 100 may include one or more storage devices such as static memory 110 or drive unit 122. The information handling system 100 may include or interface with one or more communications ports for communicating with external devices, as well as various input and output (I/O) devices 144, such as a docking station 156, a mouse 154, a trackpad 152, a stylus 150, a keyboard 148, a video/graphics display device 146, the first wireless peripheral device 156, the second wireless peripheral device 178, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the hardware processor 102, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute one or more bus drivers in order to transmit this data between the information handling system 100 and the input/output devices 144 described herein. In an embodiment, the information handling system 100 may be in wired or wireless communication with the I/O devices 144 such as an audio headset 199, audio earbuds 198, wireless headset dock 196, docking station, a keyboard 148, a mouse 154, video display device 146, stylus 150, trackpad 152, the first wireless peripheral device 156, or the second wireless peripheral device 178 described herein, among other peripheral devices.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system 100 may also be operatively coupled to a wired or wireless input/output device 144 such as the first wireless peripheral device 156 and second wireless peripheral device 178 or that may include a hardware processing device such as a hardware processor, microcontroller, or other hardware processing resource. Various drivers and hardware control device electronics may be operatively coupled to operate the I/O devices 144 according to the embodiments described herein. The present specification contemplates that the I/O devices 144 may be wired or wireless.

A network interface device of the information handling system 100 may be wired or wireless such as shown with wireless interface adapter 130 that can provide wireless connectivity among devices such as with Bluetooth® or Bluetooth® Low Energy (BLE) protocols or to a network 138, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antennas 136-1 and 136-2 is used to communicate with the wireless peripheral devices including the first wireless peripheral device 156 and second wireless peripheral device 178, via, for example, a Bluetooth® or Bluetooth® Low Energy (BLE) protocols. In other embodiments, Bluetooth®, BLE or other WPAN or WLAN may be used for communication with and among a wireless peripheral devices such as the first wireless peripheral device 156, a second wireless peripheral device 178, or any other wireless peripheral device that is associated with the first wireless peripheral device 156 and second wireless peripheral device 178 as a group of wireless peripheral devices to be paired with the information handling system 100.

In other embodiments, a WAN, WWAN, LAN, and WLAN may each include an AP 140 or base station 142 used to operatively couple the information handling system 100 to a network 138 via a wireless interface adapter 130. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136-1 or 136-2 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, an existing wireless peripheral device, such as the first wireless peripheral device 156 in an example embodiment, is currently paired to a first information handling system, such as 100. The first information handling system 100 is part of a list of previously paired information handling systems to which the first wireless peripheral device 156 has been previously paired. A newly purchased peripheral device, such as 178, may also be paired, according to embodiments herein, by execution of computer-readable program code of a gateway automated wireless pairing agent 165 to coordinate with computer-readable program code of a gateway automated wireless pairing module 164 executing in the first wireless peripheral device 156. In this way, the first wireless peripheral device 156 operates as a gateway wireless peripheral device and executes computer-readable program code of a gateway automated wireless pairing module 164 to orchestrate a secure automatic pairing of the subordinate, second pairing peripheral device 178 to each of the information handling systems, including 100, to which the gateway peripheral device 156 has previously paired. The trust of the first wireless peripheral device 156 having previous paired with the list of information handling systems, including 100, is extended to the subordinate, second pairing peripheral device 178 while minimizing or negating user participation or input in these pairing processes of the subordinate, second pairing peripheral device 178. The information handling system 100 may be operatively and wirelessly coupled to any number of wireless peripheral devices including the first wireless peripheral device 156 and second wireless peripheral device 178 described herein. Again, this wireless coupling, may include a pairing requirement before active wireless input/output (I/O) communications are established and may include the communication from any wireless peripheral device that initiates a pairing communication with the information handling system 100 to engage in the pairing process.

In specific embodiments herein, the first wireless peripheral device 156 may be an existing wireless peripheral device that has been previously paired with the information handling system 100, and is currently communicating with the information handling system 100 via a direct wireless link to the information handling system 100 at a secure Bluetooth® Low Energy (BLE) host address specific to the paired information handling system 100. The previously-paired or already existing first wireless peripheral device 156 in an embodiment may securely communicate with the information handling system 100 to orchestrate pairing via execution of code instructions for a secure, gateway automated wireless pairing agent 165 on a newly purchased or newly added second wireless peripheral device 178 that has never been previously paired with the information handling system 100. Embodiments of the present specification describe secure, gateway automated wireless pairing system and method for one or more of such newly added wireless peripheral devices 178 to the information handling system 100 to automate secure pairing of a newly added wireless peripheral device, such as 178, to a plurality of information handling systems, including 100, via an extension of trust of the first wireless peripheral device 156 with the information handling system 100. The first wireless peripheral device 156 operates as a gateway wireless peripheral device and provides a cloned copy of clone extended directed generic attribute (GATT) communication profile metadata to the second, subordinate wireless peripheral device 178 which may remove or minimize requirements for user input at the newly added wireless peripheral device, including 178, during each of these pairing processes.

During pairing, any of the first wireless peripheral device 156, second wireless peripheral device 178, or any other wireless peripheral device within a group of wireless peripheral devices may be initiated by a user. This initiation process may include the user activating a power button, switch, or other key that causes, in an embodiment, a first wireless peripheral device PMU 168 and second wireless peripheral device PMU 184 to provide power to the first wireless peripheral device microcontroller 158 and second wireless peripheral device microcontroller 180, respectively. To automate secure pairing between a newly added wireless peripheral device, such as 178 and a plurality of information handling systems, including 100, to which the newly added wireless peripheral device 178 may need to pair, the newly added second wireless peripheral device 178 assumes a subordinate role to the first pairing peripheral device 156 to receive the clone extended directed GATT communication profile metadata for direct, secure communications with the information handling system 100. This clone extended directed GATT communication profile metadata is used by the subordinate second wireless peripheral device 178 to remove or reduce user participation in these pairing processes, the systems and methods described herein allow for an initial to automatically determine itself as and then act as a gateway device. In an embodiment, each of the first wireless peripheral device microcontroller 158 of the gateway first wireless peripheral device 158 execute computer-readable program code instructions of a gateway automated wireless pairing module 164. The second wireless peripheral device microcontroller 180 of the subordinate second wireless peripheral device or other wireless peripheral devices executes computer-readable program code instructions of a gateway automated wireless pairing agent 165.

The user of an existing, first wireless peripheral device 156 in an embodiment may execute a hotkey actuation to activate the first wireless peripheral device microcontroller 158 to execute computer-readable program code of the gateway automated wireless pairing module 164 to prepare to clone extended directed GATT communication profile metadata of the existing first wireless peripheral device 156 for use with the newly added and not yet paired second wireless peripheral device 178. In an embodiment, the first wireless peripheral device 156 currently paired to the information handling system 100 may execute computer-readable program code of the gateway automated wireless pairing module 164 to determine that the existing wireless peripheral device 156 has been hotkey activated by a user providing a specific combination of user inputs to act as a gateway peripheral device 156 to direct pairing of a newly added subordinate wireless peripheral device 178 with the first information handling system 100. The existing first wireless peripheral device 156 will reconnect to a first host information handling system (e.g., 100) it has previously paired with if not actively wirelessly coupled already. Some portion of the clone extended directed GATT communication profile metadata including seed data for generating a pairing passcode and a group identification (ID) value and metadata indicating common ownership between the first wireless peripheral device 156 and any subordinate second wireless peripheral devices 178 may be provided to the host information handling system 100. This may extend the trust of the first wireless peripheral device 156 to the subordinate second wireless peripheral device 178.

The existing wireless peripheral device 156 currently paired to the first information handling system 100 may then assume a role as a gateway peripheral device to orchestrate pairing of newly added subordinate wireless peripheral device 178 with the first information handling system 100. The first wireless peripheral device microcontroller 158 in an embodiment may execute computer-readable program code of the gateway automated wireless pairing module 164 at the existing first wireless peripheral device 158 to prepare the clone extended directed GATT communication profile metadata. Such clone extended directed GATT communication profile metadata may include a passcode seed, BLE host address for pairing with the first information handling system 100, a group ID 162 that identifies both the existing first wireless peripheral device 156 and the newly added second wireless peripheral device 178 as part of a recognized group of peripheral devices that may be identified for a user, and device ownership data of ownership of the existing first wireless peripheral device 156 and the second wireless peripheral device 178, in an embodiment. The group ID 162 and ownership of the existing and newly added wireless peripheral devices 156 and 178, respectively, may be previously loaded or added upon purchase or provisioning of the existing first wireless peripheral device 156 or the newly added second wireless peripheral device 178 by an information technology decision maker (ITDM) of an enterprise, a user, or by a manufacturer identifying a purchase of both the existing and newly added wireless peripheral devices 156 and 178. The ownership may be common, for example, among the first wireless peripheral device 156 and the second wireless peripheral device 178 as a form of authorization to belong under the same group ID 162. The clone extended directed GATT communication profile metadata may be provided from the existing first wireless peripheral device 156 to the newly added second wireless peripheral device 178 via a GATT communication and using a GATT copy process to the newly added second wireless peripheral device 178. An extended directed GATT communication between the existing first wireless peripheral device 156 and the newly-added second wireless peripheral device 178 between directed BLE gateway addresses may be used to secure the GATT simple copy process of transferring the clone extended directed GATT communication profile metadata to the newly-added second wireless peripheral device 178.

The existing wireless peripheral device 156 currently paired to the first information handling system 100 may orchestrate pairing of newly added subordinate wireless peripheral device 178 with the first information handling system 100 using seed values generated at the gateway peripheral device and transmitted to both the first information handling system 100 via the secure communication at the BLE host address specific to the information handling system 100, and to the newly purchased or added subordinate wireless peripheral device 178, via a wireless link established at a secure BLE gateway address for the gateway peripheral device 156. These seed values may be used in an embodiment at the information handling system 100 and at the subordinate wireless peripheral device 178 for generation of matching pairing credentials, keys, or passcodes in embodiments herein. One or more hashloop algorithms may be executed using the shared seed value or values at the information handling system 100 and at the subordinate wireless peripheral device 178 to generate matching pairing passcodes for example.

Hotkey actuation codes may associate a recognized user input specific to a type of wireless peripheral device 156 or 178 with a command instruction to cause the first wireless peripheral device 156 to assume the role as a gateway peripheral device or the second wireless peripheral device 178 to assume a subordinate wireless peripheral device role in some embodiments herein. For example, a keyboard 148 hotkey code may associate the simultaneous pressing of specifically identified keys with code instructions to initiate gateway peripheral device role in an example embodiment to orchestrate pairing of a second wireless peripheral device 178 to the information handling system 100. As another example, a mouse 154 hotkey code may associate simultaneous pressing of one or more buttons with a specific movement of the mouse or scrolling or pressing of the scroll wheel. As yet another example, a hotkey code for an audio headset 199 worn over the user's ears may include simultaneous pressing of two or more input buttons, such as the volume, power, or other input buttons. In yet another example, a hotkey code for a stylus 150 may include simultaneous pressing of two or more buttons or specific movement of the stylus with respect to a tablet surface. In still another example, a hotkey code for a video display device 146 may include simultaneous pressing of multiple buttons on the video display device or on a remote control for the video display device. In another example still, a hotkey code for a trackpad 152 may include simultaneous pressing of one or more buttons or surfaces of the trackpad and movement of a finger across the trackpad. As yet another example, a hotkey code for an audio earbud 198 may include voice activation via a microphone, a keypress of a user interface button for the peripheral device, or a user tapping an outer surface of the audio earbud.

In an embodiment, the newly added and not yet paired peripheral device 178 may also execute computer-readable program code of the gateway automated wireless pairing agent 165 to determine that the newly added wireless peripheral device 178 has been hotkey activated by a user providing another specific combination of user inputs to act as a subordinate wireless peripheral device to the gateway peripheral device 156 in some embodiments to receive pairing instructions and a the clone extended directed GATT communication profile metadata copy for pairing with the information handling system 100. In some embodiments, hot key actuation of the newly added wireless peripheral device 178 may not be necessary and initiation of the newly added wireless peripheral device 178 may trigger operation as a subordinate wireless peripheral device to receive pairing instructions and the clone extended directed GATT communication profile metadata copy for pairing with the information handling system 100. In either embodiment, the newly added wireless peripheral device 178 not yet paired to the information handling system 100 assumes a role as a subordinate wireless peripheral device to the gateway peripheral device 156 to await receipt of pairing credentials, keys, passcodes, or other pairing requirements and instructions in the clone extended directed GATT communication profile metadata copy from the existing wireless peripheral device 156 acting as the gateway device for pairing with the information handling system 100.

In an embodiment, the subordinate wireless peripheral device 178 and each of the information handling systems, including 100 may independently generate identical pairing passcodes or credentials using the received seed values. The subordinate wireless peripheral device 178 may first pair with the information handling system 100 using this identical pairing passcode and transmit the passcode or verification that the passcode has been generated to the information handling system 100 at the secure BLE host address specific to that information handling system 100 from the subordinate wireless peripheral device 178. For the newly added subordinate wireless peripheral device 178 in embodiments herein, this process may be repeated with other information handling systems (not shown) to which the gateway peripheral device 156 has been previously paired using a list of BLE host addresses sent with the clone extended directed GATT communication profile metadata until the subordinate wireless peripheral device 178 has paired with each of the information handling systems, including 100, to which the gateway peripheral device 156 has previously paired.

In an embodiment, the clone extended directed GATT communication profile metadata copy includes data describing a common peripheral device (PD) group ID 162 that is maintained on a first wireless peripheral device storage device 160 and second wireless peripheral device storage device 182 of a first wireless peripheral device 156 and second wireless peripheral device storage device 182, respectively. In an embodiment, for all peripheral devices within a group of peripheral devices that are to be paired with the information handling system 100, this common PD group ID 162 may be stored on respective wireless peripheral device storage devices. In an embodiment, each wireless peripheral device such as 156 is capable of broadcasting a group ID pairing beacon that includes this common PD group ID 162 to identify itself as the gateway peripheral device when acting as a gateway peripheral device to other subordinate second wireless peripheral device 178 within the identified group. The group ID pairing beacon in an embodiment may further include a secure BLE gateway address specific to the first wireless peripheral device 156 acting as the gateway peripheral device for secure communication of seed values from the first wireless peripheral device 156 acting as the gateway peripheral device to the second wireless peripheral device 178 acting as the subordinate wireless peripheral device.

In an embodiment, the first wireless peripheral device 156 and second wireless peripheral device 178 as well as any other number of peripheral devices may be associated with each other using this common PD group ID 162 when a user has purchased these peripheral devices. For example, an internet technology decision maker (ITDM) may purchase a new peripheral device 178 for an existing employee that has been assigned a previously purchased first wireless peripheral device 156 that has also already been paired with a plurality of information handling systems, including 100, such as a home computer, a work computer, or a gaming computer, that may also be assigned to the employee. This purchase may include any number of wireless peripheral devices including a wireless mouse 154, a wireless keyboard 148, a wireless video display device 146, a wireless stylus 148, among other peripheral devices. Thus, although FIG. 1 shows a first wireless peripheral device 156 and a second wireless peripheral device 178, it is appreciated that the first wireless peripheral device 156 and second wireless peripheral device 178 may be any type of wireless peripheral device and that any number of wireless peripheral devices may be grouped together at their respective times of purchase by virtue of common ownership or management of such wireless peripheral devices.

The common peripheral device group ID 162 may be stored on each of the grouped peripheral devices purchased, such as in a group of peripheral devices. The common peripheral device group ID 162 may be stored by the manufacturer, seller, or an ITDM in embodiments herein. In other scenarios, a user may complete a similar purchase via an online retail store that includes a plurality of wireless peripheral devices (e.g., 156, 178, 146, 148, 150, 152, 154, etc.) with each of the wireless peripheral devices maintaining a common PD group ID 162 on their respective peripheral device storage devices (e.g., first wireless peripheral device storage device 160 and second wireless peripheral device storage device 182). Because this common PD group ID 162 is common among all of the wireless peripheral devices to be wirelessly coupled to the information handling system 100, the broadcasting of the group ID pairing beacon by a gateway peripheral device will be recognized by each subsequently added subordinate wireless peripheral device.

In an embodiment, the first wireless peripheral device 156 may, after being determined to be the gateway peripheral device via a hotkey actuation, begin to broadcast the group ID pairing beacon for wireless peripheral devices, such as 178 to be subordinate wireless peripheral devices to detect and to receive further pairing instructions from the gateway peripheral device 156 for pairing. This broadcast of the group ID pairing beacon informs wireless peripheral devices within wireless range, such as second wireless peripheral device 178 to act as subordinate wireless peripheral devices for orchestration of pairing processes. This includes the subordinate second wireless peripheral device 178 to await for directions from the first wireless peripheral device 156 acting as the gateway peripheral device. In an embodiment, the first wireless peripheral device 156 acting as the gateway peripheral device may cause the group ID pairing beacon to be broadcasted using a generic attribute profile (GATT) transmission such as under a BLE standard. This GATT transmission may initiate a secure communication with each of the subsequently-initiated and newly added wireless peripheral devices including the second wireless peripheral device 178 to establish a gateway/subordinate relationship with each of the other peripheral devices and provide directions to wait for pairing instructions as described herein.

The second wireless peripheral device 178 may establish a secure extended direct GATT communication mode wireless link with the first wireless peripheral device 156 at the secure BLE gateway address for the first wireless peripheral device 156 given within the broadcasted group ID pairing beacon for receipt of seed data, as described directly below. In an embodiment, the first wireless peripheral device 156 may transmit, via such a secure extended direct GATT communication mode wireless link, a clone extended directed GATT communication profile metadata that includes a list of secure BLE host addresses, each associated with one of a plurality of information handling systems, including 100, with which the first wireless peripheral device 156 has previously paired. Using this same secure extended direct GATT communication mode wireless link, the first wireless peripheral device 156 may transmit seed values generated at the gateway peripheral device 156 (e.g., by a random number generator) in the clone extended directed GATT communication profile metadata. This seed data may also have been copied and securely transmitted to the first information handling system 100 via the secure communication at the BLE host address specific to the information handling system 100 generate a pairing passcode, keys, or other pairing credentials at the information handling system 100. With the pairing instructions and the clone extended directed GATT communication profile metadata having the seed data, the subordinate wireless peripheral device 178 will be able to generate matching pairing credentials, keys, or passcodes.

In an embodiment, the subordinate wireless peripheral device 178 and each of the information handling systems, including 100 may independently generate identical pairing passcodes or credentials using the received seed values. The subordinate wireless peripheral device 178 may first pair with the information handling system 100 using verification of generation of identical pairing passcodes using the secure BLE host address specific for a secure directed link from the subordinate wireless peripheral device 178 to that information handling system 100, as provided by the gateway peripheral device 156 in the received pairing instructions and the clone extended directed GATT communication profile metadata. In an embodiment, this process may be repeated with other information handling systems (not shown) to which the gateway peripheral device 156 has been previously paired until the subordinate wireless peripheral device 178 has paired with each of the information handling systems, including 100 to which the gateway peripheral device 156 has previously paired.

The seed data may be used, concurrently, by both the hardware processor 102 of the information handling system 100 and the second wireless peripheral device microcontroller 180 of the second wireless peripheral device 178 to generate one or more secure passcodes to be stored within the passcode list 194 on the second wireless peripheral device storage device 182 of the second wireless peripheral device 178 and a data storage device of the information handling system 100. These generated secure passcodes within the passcode list 194 may be later used by the subordinate wireless peripheral devices (e.g., second wireless peripheral device 178 in this example embodiment), at the direction of the first wireless peripheral device 156, to automatically pair the subordinate wireless peripheral devices to one or more information handling systems 100. In an embodiment, one or more seed values may be generated by the first wireless peripheral device microcontroller 158 using, for example, a random number generator (RNG) and sent to the subordinate wireless peripheral device 178 for generation of the list of secure passcodes of the passcode list 194 for pairing with each of the information handling system 100 for which a BLE host address has been provided.

In some embodiments, a single passcode may be generated using at least one of the seed values. In another embodiment, a single seed value may generate a plurality of passcodes to form the passcode list 194 on a subordinate wireless peripheral device 178 for use to pair with plural information handling systems. In yet another embodiment, a second seed value may be used to identify which of the passcodes within the passcode list 194 should be used to pair the subordinate wireless peripheral device 178 with different information handling systems (not shown). In some cases, determination of which passcode within the passcode list 194 to use during pairing with any one of the plurality of information handling systems 100 may be made using a first counter at the first wireless peripheral device 156 acting as the gateway peripheral device and a second counter at the second wireless peripheral device 178 acting as the subordinate gateway peripheral device that determines time elapsed since the first wireless peripheral device 156 transmitted the seed values to the second wireless peripheral device 178.

In an embodiment, both the hardware processor 102 of the information handling system 100 and the first wireless peripheral device microcontroller 158 of the first wireless peripheral device 156 may concurrently execute a hash loop algorithm 196 or function that generates the one or more passcodes within this list of secure passcodes of the passcode list 194. The hash loop algorithm 196 may include computer-readable program code stored on a data storage device and executed by the hardware processors, such as hardware processor 102 for the information handling system and a first wireless peripheral device microcontroller 158 that generates this list of secure passcodes of the passcode list 194 on the subordinate wireless peripheral device 178. In one embodiment, the hash loop algorithm 196 includes a time-based hash loop algorithm that runs a loop of advance encryption algorithms and a secure hash algorithm 256 (SHA256) hybrid algorithm to generate one or more passcodes of the passcode list 194 based on the seed values, and in some cases, the time that has elapsed since the first wireless peripheral device 156 transmitted the seed values to the second wireless peripheral device 178.

The first wireless peripheral device 156 acting as the gateway peripheral device and previously paired to the information handling system 100, may begin to coordinate with the other wireless peripheral devices such as the second wireless peripheral device 178 to begin to pair with the plurality of information handling systems, including 100. Because the second wireless peripheral device microcontroller 180 is to generate the same list of secure passcodes of the passcode list 194 as at least one passcode generated by the hardware processor 102, the hash loop algorithm 196 and a seed value used may be the same as those used by the hardware processor 102 to generate this list of secure passcodes of the passcode list 194. As a result, the pairing process of the second wireless peripheral device 178 may be automatically completed after the second wireless peripheral device microcontroller 180 has generated one of the passcodes of the passcode list 194 within the list of secure passcodes, and the second wireless peripheral device radio 188 has transmitted the passcode or verification that the passcode has been generated to the information handling system 100. Such a transmission may be performed via a secure extended direct GATT communication mode wireless link established with the information handling system 100 at the secure BLE host address specific to that information handling system 100, as given within the secure transmission received from the first wireless peripheral device 156 acting as the gateway peripheral device. Because the information handling system 100 has generate a matching secure passcodes stored in a data storage device within the information handling system 100, the hardware processor 102 of the information handling system 100 may cross-reference the passcode received from the second wireless peripheral device 178 with that generated either allow or deny pairing with the second wireless peripheral device 178 in one embodiments. In other embodiments, verification that the passcodes generated will match may be transmitted via the secure extended direct GATT communication mode wireless link established with the information handling system 100 at the secure BLE host address specific to that information handling system 100. It is noted that the user may not be required to perform a predefined gesture at the second wireless peripheral device 178. This is because the second wireless peripheral device 178 has the use of the generated list of secure passcodes and the independent execution of the hash loop algorithm 196 used to derive or generate the list of secure passcodes via use of the first seed value and second seed value in parallel to that generated at the information handling system 100 with this seed value or values.

It is appreciated that the seed values and any secure BLE host addresses may be transmitted, securely via a GATT communication, to any of the subordinate wireless peripheral devices (e.g., second wireless peripheral device 178) at any time and may occur prior to directing the second wireless peripheral device 178 to initiate the pairing process with the information handling system 100. In an embodiment, as the first wireless peripheral device 156 transmits the first seed value and second seed value to the information handling system 100 and any other operatively coupled information handling systems to be paired with the subordinate second wireless peripheral device 178. The first wireless peripheral device 156 may also transmit this seed value data to the second wireless peripheral device 178 and any other subordinate wireless peripheral device via clone extended directed GATT communication profile metadata in a wireless link established with the second wireless peripheral device 178 at the secure BLE gateway address specific to the first wireless peripheral device 156.

It is appreciated that the processes associated with the first wireless peripheral device 156 coordinating the pairing of the second wireless peripheral device 178 to the information handling system 100 may optionally be similarly repeated for every other information handling system to which the first wireless peripheral device 156 acting as the gateway peripheral device has previously been paired, as those other information handling systems (not shown) come into BLE range of the first wireless peripheral device 156 and the second wireless peripheral device 178.

In order to communicate with the information handling system 100, each of the first wireless peripheral device 156 and second wireless peripheral device 178 include a wireless peripheral device radio 172, 188, a wireless peripheral device RF front end 174, 190, and a wireless peripheral device antenna 176, 192. These allow each of the first wireless peripheral device 156 and second wireless peripheral device 178 to transceive data to and from the wireless interface adapter 130 of the information handling system 100 via a second antenna 136-2. In an embodiment, these radio frequency transmissions and reception between the first wireless peripheral device 156, second wireless peripheral device 178, and information handling system 100 may be Bluetooth® or BLE® wireless, or other WPAN or WLAN communications that operate under those radio frequencies associated with those wireless protocols.

In an embodiment, each of the first wireless peripheral device 156 and second wireless peripheral device 178 may further include a first wireless peripheral device PMU 168 and second wireless peripheral device PMU 184, respectively. The PMUs 168, 184 may include hardware controllers and executable machine-readable code instructions to manage the power provided to the components of the first wireless peripheral device 156 and second wireless peripheral device 178 such as the first wireless peripheral device microcontroller 158 and second wireless peripheral device microcontroller 180 and other hardware components described herein. In an embodiment, the PMUs 168, 184 may monitor power levels. The PMUs 168, 184 may regulate power from a power source such as the first wireless peripheral device battery 170 and second wireless peripheral device battery 186 respectively. In an embodiment, the batteries 170, 186 may provide power to the components of the first wireless peripheral device 156 and second wireless peripheral device 178 via wired connections formed on, for example, a printed circuit board (PCB) within the respective wireless peripheral devices 156, 178.

The systems and methods described herein may increase the efficiency and speed at which a wireless peripheral device, such as 146, 148, 150, 152, 154, 156, or 178 is wirelessly paired and then operatively coupled to a plurality of information handling systems, including 100, in a secure manner requiring minimal or no user interaction, and only via a secure extended direct GATT communication link to the information handling system 100 at a BLE host address specific to the information handling systems, including 100. This may prevent other nearby information handling systems from hijacking pairing credentials transmitted by the subordinate wireless peripheral device 178. The efficiency and speed of this pairing process is facilitated by a wireless peripheral device 146, 148, 150, 152, 154, 156, 178 being hotkey activated to assume the role of a gateway peripheral device that controls the pairing of any subordinate wireless peripheral device with the information handling system 100 or any other information handling systems to which the first wireless peripheral device 156 acting as the gateway peripheral device has been previously paired. Still further, the efficiency and speed at which the group of wireless peripheral devices 146, 148, 150, 152, 154, 156, 178 are coupled to the plurality of information handling systems, including 100, is also facilitated via the generation of the passcode list 194 at the subordinate second wireless peripheral device 178 allowing transmission of a passcode or verification of passcode generation or other pairing credentials to securely pair with each of the plurality of information handling systems, including 100 via a secure extended direct GATT communication mode wireless link at each respective secure BLE host address specific to those information handling systems (e.g., 100) without requiring a predetermined gesture or manual entry or confirmation of a passcode to be performed during pairing with each of the plurality of information handling systems that includes 100.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2A:
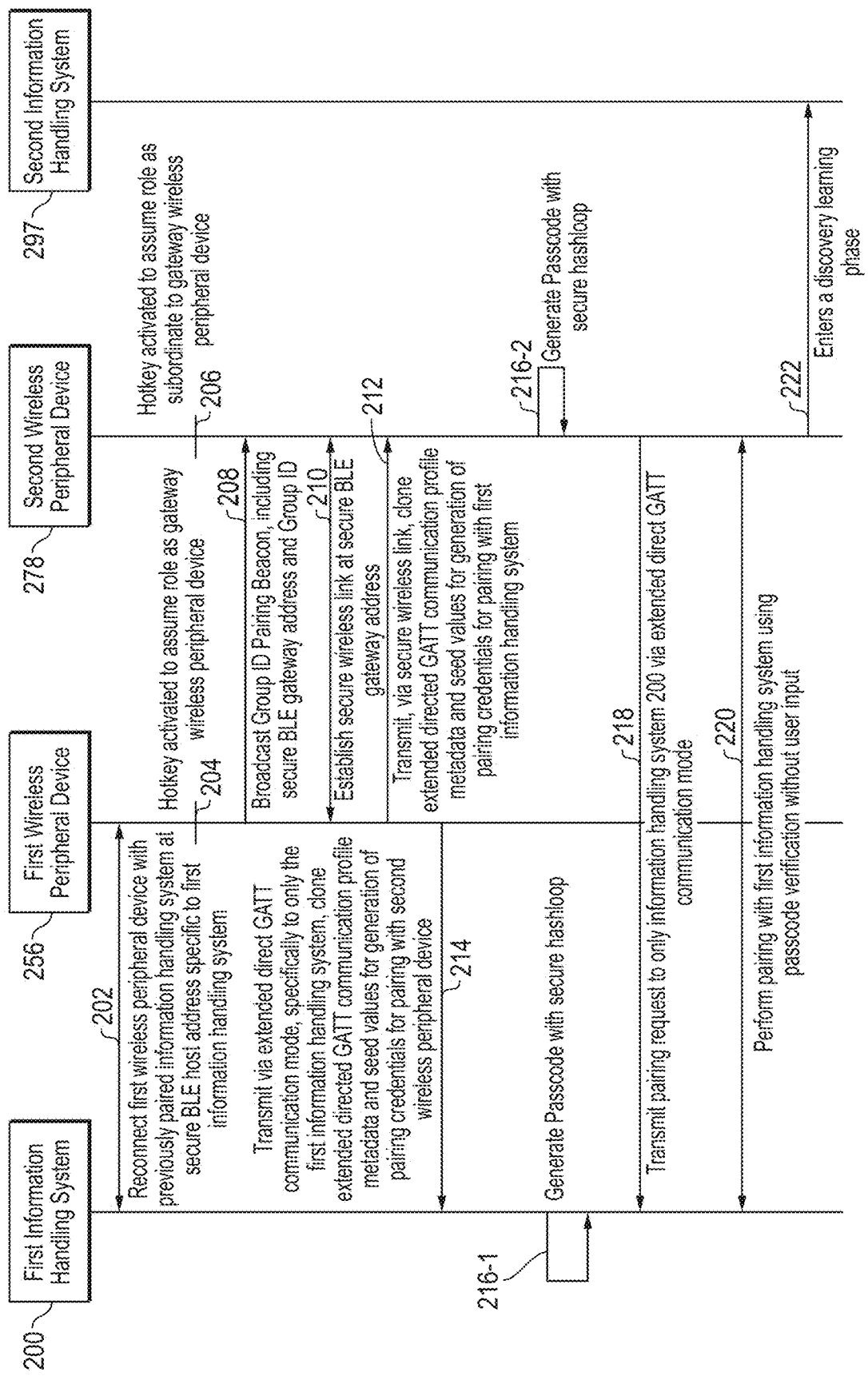
FIG. 2A is a flowchart showing a method of pairing a newly added second wireless peripheral device to a first of a plurality of information handling systems upon receipt of clone extended directed generic attribute (GATT) communication profile metadata for pairing from a first wireless peripheral device according to an embodiment of the present disclosure.
Figure 2B:
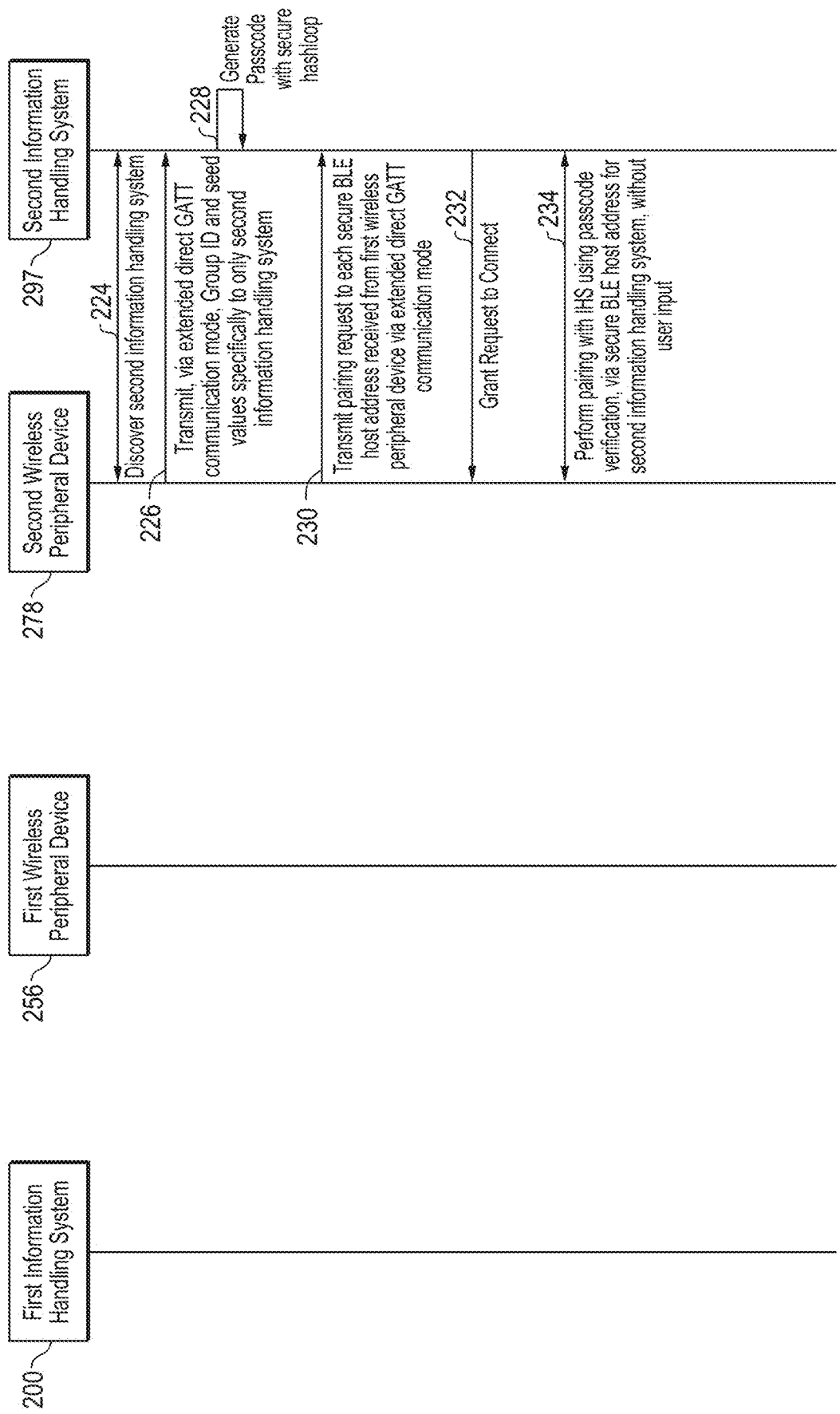
FIG. 2B is a continuation flowchart showing a method of pairing the newly added second wireless peripheral device to a second of the plurality of information handling systems.

FIG. 2A is a swim lane flowchart showing a method 201 of pairing a newly added wireless peripheral device 278 to a first information handling system 200 and a second information handling system 297 according to an embodiment of the present disclosure. FIG. 2B is a continuation swim lane flowchart showing the method 201 of pairing a newly added wireless peripheral device 278 to a first information handling system 200 and a second information handling system 297 according to an embodiment of the present disclosure. It is appreciated that, although FIG. 2A and FIG. 2B show a first information handling system 200 and a second information handling system 297, the systems and methods described herein apply to pairing a newly added wireless peripheral device 278 to any number of information handling systems that have previously paired with the existing or previously paired wireless peripheral device 256, which may be more or fewer than those shown and described in FIGS. 2A and 2B.

The method 201 may begin, at line 202, with the first wireless peripheral device 256, which has previously been paired with a plurality of information handling systems, including 200 and 297, reconnecting with the previously paired first information handling system 200 at a secure BLE host address specific to first information handling system 200. This may occur, in an embodiment automatically upon powering up of the first wireless peripheral device 256 within BLE range of the first information handling system 200, since these two devices have been previously paired.

The existing first wireless peripheral device 256 will reconnect to a first host information handling system 200 that it has previously paired with if not actively wirelessly coupled already. The existing first wireless peripheral device 256 currently paired to the first information handling system 200 assumes a role as a gateway peripheral device to orchestrate pairing of newly added subordinate wireless peripheral device 278 with the first information handling system 200. The first wireless peripheral device microcontroller in an embodiment may execute computer-readable program code of the gateway automated wireless pairing module at the existing first wireless peripheral device 256 to prepare the clone extended directed GATT communication profile metadata. Such clone extended directed GATT communication profile metadata may include a passcode seed, BLE host addresses for pairing with the first information handling system 200 and a second information handling system 297, a group ID that identifies both the existing first wireless peripheral device 256 and the newly added second wireless peripheral device 278 as part of a recognized group of peripheral devices that may be identified for a user, and device ownership data of ownership of the existing first wireless peripheral device 256 and second wireless peripheral device 278, in an embodiment. The group ID and ownership of the existing and newly added wireless peripheral devices 256 and 278, respectively, may be previously loaded or added upon purchase or provisioning of the existing first wireless peripheral device 256 and the newly added second wireless peripheral device 278 by an information technology decision maker (ITDM) of an enterprise, a user, or by a manufacturer identifying a purchase of both the existing and newly added wireless peripheral devices 256 and 278.

At line 204, the first wireless peripheral device 256 may be hotkey activated to trigger gateway automated wireless pairing assistance by assuming a role as a gateway wireless peripheral device. The user of an existing wireless peripheral device 256 in an embodiment may execute a hotkey actuation to activate the first wireless peripheral device microcontroller to execute computer-readable program code of the gateway automated wireless pairing module 264 to prepare to clone extended directed GATT communication profile metadata of the existing first wireless peripheral device 256 for use with the newly added and not yet paired second wireless peripheral device 278. The first wireless peripheral device 256 currently paired to the information handling system 200 may execute computer-readable program code of a gateway automated wireless pairing module to determine that the existing first wireless peripheral device 256 has been hotkey activated by a user providing a specific combination of user inputs to act as a gateway peripheral device 256 to direct pairing of a newly added subordinate wireless peripheral device 278 with the first information handling system 200 and any other information handling systems, including 297, with which the first wireless peripheral device 256 has previously paired.

The existing wireless peripheral device 256 currently paired to the first information handling system 200 may orchestrate pairing of newly added subordinate wireless peripheral device 278 with the first information handling system 200 using seed values generated at the gateway peripheral device and transmitted to both the first information handling system 200 via the secure communication at the BLE host address specific to the first information handling system 200, and to the newly purchased or added subordinate wireless peripheral device 278, via a wireless link established at a secure gateway BLE address for the gateway peripheral device 256. As described in greater detail with respect to FIG. 2B, upon the second wireless peripheral device 278 coming within BLE range of the second information handling system 297, wireless peripheral device has all of the necessary information including seed data and secure BLE host address for the second information handling system 297 to establish the secure communication at the BLE host address specific to the second information handling system 297. These seed values may be used in an embodiment for generation of matching pairing credentials, keys, or passcodes, or the like.

In an embodiment at line 206, the newly added and not yet paired peripheral device 278 may also execute computer-readable program code of a gateway automated wireless pairing module to determine that the newly added wireless peripheral device 278 has been hotkey activated by a user providing another specific combination of user inputs to act as a subordinate wireless peripheral device to the gateway peripheral device 256 to receive pairing instructions for pairing with the information handling systems 200. The newly added wireless peripheral device 278 not yet paired to the information handling systems 200 or 297 may then assume a role as a subordinate wireless peripheral device to the gateway peripheral device 256 to await receipt of pairing credentials, keys, passcodes, or other pairing requirements and instructions from the existing wireless peripheral device 256 acting as the gateway device for pairing with the information handling systems 200.

At line 208 in an embodiment, the first wireless peripheral device 256 acting as the gateway peripheral device may broadcast a Group ID Pairing Beacon, including a secure BLE gateway address and a common Group ID. Data describing a common peripheral device (PD) group ID is maintained on a first wireless peripheral device 256 storage device and second wireless peripheral device 278 storage device. In an embodiment, for all peripheral devices, including 256 and 278 within a group of peripheral devices that are to be paired with each of the information handling systems 200 and 297 to which the first wireless peripheral device 256 has been previously paired, this common peripheral device group ID may be stored on respective wireless peripheral device storage devices. In an embodiment, each wireless peripheral device, such as 256 and 278 is capable of broadcasting a group ID pairing beacon that includes this common PD group ID to identify itself as the gateway peripheral device when acting as a gateway peripheral device. The group ID pairing beacon in an embodiment may further include a secure BLE gateway address specific to the first wireless peripheral device 256 acting as the gateway peripheral device for secure communication of clone extended directed GATT communication profile metadata from the first wireless peripheral device 256 acting as the gateway peripheral device to the second wireless peripheral device 278 acting as the subordinate wireless peripheral device.

In an embodiment, the first wireless peripheral device 256 may, after being determined to be the gateway peripheral device, begin to broadcast the group ID pairing beacon for wireless peripheral devices, such as 278 that have been hotkey activated to act as subordinate wireless peripheral devices, to detect and to receive further pairing instructions from the gateway peripheral device 256. This broadcast of the group ID pairing beacon informs peripheral devices, such as 278 that have been hotkey activated in some embodiments to act as subordinate wireless peripheral devices to await for directions from the first wireless peripheral device 256 acting as the gateway peripheral device. In an embodiment, the first wireless peripheral device 256 acting as the gateway peripheral device may cause the group ID pairing beacon to be broadcasted using a generic attribute profile (GATT) transmission such as under a BLE standard. This GATT transmission may initiate a communication with each of the subsequently-initiated peripheral devices including the second wireless peripheral device 278 to establish a gateway/subordinate relationship with each of the other peripheral devices and provide directions to wait for pairing instructions as described herein.

At line 210 in an embodiment, the second wireless peripheral device 278 may establish a secure extended direct GATT communication mode wireless link with the first wireless peripheral device 256 at the secure BLE gateway address for the first wireless peripheral device 256 given within the broadcasted group ID pairing beacon for receipt of clone extended directed GATT communication profile metadata as described directly below.

In an embodiment at line 212, the first wireless peripheral device 256 may transmit, via such a secure extended direct GATT communication mode wireless link, clone extended directed GATT communication profile metadata, including a list of secure BLE host addresses, each associated with one of a plurality of information handling systems, including 200 and 297, with which the first wireless peripheral device 256 has previously paired. Using this same secure extended direct GATT communication mode wireless link, the first wireless peripheral device 256 may transmit clone extended directed GATT communication profile metadata including seed values generated at the gateway first wireless peripheral device 256 (e.g., by a random number generator) to the newly purchased or added subordinate wireless peripheral device 278, to generate at the subordinate wireless peripheral device 278 pairing credentials, keys, or passcodes. The clone extended directed GATT communication profile metadata may further include group ID data including both the gateway first wireless peripheral device 256 and the subordinate second wireless peripheral device 278 as well as common ownership or management data for both. The clone extended directed GATT communication profile metadata may be provided from the existing first wireless peripheral device 256 to the newly added second wireless peripheral device 278 via GATT communication and with a GATT copy process to the newly added second wireless peripheral device 278.

At line 214, using another secure extended direct GATT communication mode wireless link, the first wireless peripheral device 256 may transmit the group ID data including both the gateway first wireless peripheral device 256 and the subordinate second wireless peripheral device 278 as well as common ownership or management data for both and the same seed values generated at the gateway peripheral device 256 to the first information handling system 200 via the secure communication at the BLE host address specific to the information handling system 200. The seed values are used to generate at the information handling system 200 matching pairing credentials, keys, or passcodes to those generated at the second wireless peripheral device 278.

At lines 216-1 and 216-2 in an embodiment, the subordinate wireless peripheral device 278 and the first information handling system 200 may independently generate identical pairing passcodes or credentials using the received seed values. The subordinate wireless peripheral device 278 may first pair with the information handling system 200 to which the gateway peripheral device is currently operatively coupled. The seed values previously transmitted to the information handling system 200 at the secure BLE host address specific to that information handling system 200, as provided by the gateway peripheral device 256, are used to generate the pairing passcode at the information handling system 200. This generated secure passcode may be later used with matching passcodes generated at the subordinate second wireless peripheral device 278, at the direction of the first wireless peripheral device 256, to automatically pair the subordinate second wireless peripheral device 278 to the information handling system 200 via transmission of the pairing passcode or exchange encrypted passcode keys or other verification of generation of the parallel pairing passcodes. In an embodiment, both a hardware processor of the information handling system 200 and the second wireless peripheral device 278 microcontroller may concurrently execute a hash loop algorithm or function that generates the secure passcode, as described in greater detail above with respect to FIG. 1. Because the second wireless peripheral device 278 microcontroller is to generate the same secure passcode as that generated by the first information handling system 200, the hash loop algorithm may be the same as those used by the first information handling system 200 to generate the secure passcode.

In an embodiment at line 218, the second wireless peripheral device 278 may transmit a pairing request to only information handling system 200 via secure extended direct GATT communication mode at the secure BLE host address for that information handling system 200. This secure BLE host address may have been received above at line 212 from the first wireless peripheral device 256, via the secure wireless link between the first wireless peripheral device 256 and the second wireless peripheral device 278. Such a request to connect may also include the Group ID and ownership information received within the clone extended directed GATT communication profile metadata at the second wireless peripheral device 278 at line 212. Such a Group ID and ownership information matching that of the first wireless peripheral device 256 in an embodiment may allow the information handling system 200 to establish the same level of trust with the second wireless peripheral device 278 as currently exists with the first wireless peripheral device 256, that has previously paired and is in current secure communication with the information handling system 200. Upon approval of such a request, the second wireless peripheral device 278 and the first information handling system 200 may establish a secure wireless link at the secure BLE host address for the first information handling system 200.

At block 220 in an embodiment, the second wireless peripheral device 278 may initiate the pairing process with the first information handling system 200, via the secure wireless link established at the secure BLE host address for the first information handling system. The newly added second wireless peripheral device 278 will conduct verification of pairing credentials, keys, passcodes, or other pairing requirements and instructions from the seed value provided by the existing first wireless peripheral device 256 acting as the gateway device to pair with the first information handling system 200 using the secure BLE host address. In this way, the pairing communication is secure from any other nearby potential host information handling systems from interfering because the secure BLE host address is used. Based on confirmed identical pairing passcodes on both sides, verification or confirmation and, in some embodiments, acceptance of pairing is transmitted between the first information handling system 200 at the secure BLE host address specific to that first information handling system 200 and the newly added subordinate second wireless peripheral device 278 which received the secure BLE host address from the gateway first wireless peripheral device 256.

In some embodiments, the second wireless peripheral device 278 may transmit to the first information handling system 200 the password or other pairing credential generated at the second wireless peripheral device 278 using the seed values received from the first wireless peripheral device 256 at line 212. Such a transmission may be performed via the secure extended direct GATT communication mode wireless link established with the information handling system 200 at the secure BLE host address specific to that information handling system 200, as given within the secure transmission received from the first wireless peripheral device 256 acting as the gateway peripheral device. Because the information handling system 200 has also generated an identical passcode or pairing credential using the same seed values received from the first wireless peripheral device 256, the information handling system 200 may cross-reference or otherwise verify the passcode received from the second wireless peripheral device 278 and either allow or deny pairing with the second wireless peripheral device 278. It is noted that the user is not required to perform a predefined gesture at the second wireless peripheral device 278 or provide any user input other than the hotkey activation described herein in order to complete such pairing.

At line 222, in an embodiment, the subordinate second wireless peripheral device 278 may enter into a discovery learning phase after pairing with the first information handling system 200 is completed. The subordinate second wireless peripheral device 278 enters into the discovery learning phase to search for additional host information handling systems within BLE wireless range that may have been previously paired to the gateway first wireless peripheral device 200. This may also occur, in an embodiment when the user wishes to pair the second wireless peripheral device 278 to a second information handling system 297 (e.g., gaming computer). It may be determined in an embodiment at 222 whether any information handling systems for which the subordinate second wireless peripheral device 278 has received secure BLE host addresses have not yet paired to subordinate second wireless peripheral device 278. The subordinate second wireless peripheral device 278 may enter a discovery learning phase when the previous pairing with the first host information handling system 200 is complete. If the subordinate wireless peripheral device has not yet paired with any one of the information handling systems within this list, this may indicate a need to attempt to establish contact with a second host information handling system such as 297 at line 222 in this discovery learning phase when the subordinate second wireless peripheral device 278 is within BLE range of such a second information handling system 297.

Turning to FIG. 2B, the second wireless peripheral device 278 in such scenarios at line 224 may discover the second information handling system 297 via a beacon to the BLE host address of the second information handling system 297 to seek to establish an extended directed GATT communication with the second information handling system 297. In such an embodiment, when the second information handling system 297 is within BLE radiofrequency range of the second wireless peripheral device 278, the second information handling system 297 will respond.

At line 226, the second gateway wireless peripheral device 278 may establish an extended directed GATT communication link to the second information handling system 297 via a secure communication at the BLE host address specific to the second information handling system 297 that was previously received. The second gateway wireless peripheral device 278 may then securely transmit Group ID for the first wireless peripheral device 256 and the second wireless peripheral device 278 as well as seed values that may be identical to those transmitted to the second wireless peripheral device 278 at line 212. These seed values may be used to generate at the second information handling system 297 matching pairing credentials, keys, or passcodes to those generated at the second wireless peripheral device 278. At line 228 in an embodiment, the second information handling system 297 may independently generate the pairing passcode or credential generated at the second wireless peripheral device 278 using the received seed values.

At line 230, the second wireless peripheral device 278 in an embodiment may transmit pairing requests to the secure BLE host address received from first wireless peripheral device at line 212 via secure extended direct GATT communication link to the second information handling system, at the secure BLE host address specific to the second information handling system 297. The second wireless peripheral device 278 may do so because it has discovered the second information handling system 297, with which the first wireless peripheral device has previously paired, is within range of its current location at line 224. Such a request to connect may also include the Group ID and ownership information received within the clone extended directed GATT communication profile metadata at the second wireless peripheral device 278 at line 212. The second information handling system 297, now within BLE range of the second wireless peripheral device 278 may respond to the request to connect at line 232 to prompt the second wireless peripheral device to establish a secure wireless link with the second information handling system 297 using the secure BLE host address specific to that second information handling system 297. This secure BLE host address for the second information handling system 297 was received at the second wireless peripheral device in the clone extended directed GATT communication profile metadata at line 212. Transmission of the Group ID and ownership information matching that of the first wireless peripheral device 256, specifically to the secure BLE host address for the second information handling system 297 in an embodiment may allow the second information handling system 297 to establish the same level of trust with the second wireless peripheral device 278 as currently exists with the first wireless peripheral device 256 which has previously paired and may be in current secure communication with the second information handling system 297.

The subordinate second wireless peripheral device 278 at line 234 in an embodiment may then pair with the second information handling system 297 using the pairing passcode generated at line 228 and at 216-2 or another generated pairing passcode for the second information handling system pairing. The passcode matching may be verified via transmission of the passcode or a verification factor of the passcode generation to the second information handling system 297 at the secure BLE host address specific in a secure extended directed GATT communication link to the second information handling system 297. Then the second wireless peripheral device again enter into a discovery learning phase to search for additional host information handling systems within BLE wireless range if any BLE host addresses in the list of candidate host information handling systems remain. This process may then be repeated with other information handling systems (not shown) to which the gateway first wireless peripheral device 256 has been previously paired until the subordinate second wireless peripheral device 278 has paired with each of the listed potential host information handling systems at which point the method may end.

The systems and methods described herein may increase the efficiency and speed at which a wireless peripheral device, such as 278 is wirelessly paired and then operatively coupled to a plurality of information handling systems, including 200 and 297, in a secure manner requiring minimal or no user interaction, and only via a secure extended direct GATT communication link to the information handling systems 200 and 297 at BLE host addresses specific to those information handling systems 200 and 297. This may prevent other nearby information handling systems from hijacking pairing credentials transmitted by the subordinate wireless peripheral device 278. The efficiency and speed of this pairing process is facilitated by a wireless peripheral device 256 being hotkey activated to assume the role of a gateway peripheral device that directs the pairing of any subordinate wireless peripheral device 278 with the information handling systems 200 and 297 or any other information handling systems to which the first wireless peripheral device 256 acting as the gateway peripheral device has been previously paired. Still further, the efficiency and speed at which the wireless peripheral device 278 is paired and wirelessly coupled to the plurality of information handling systems 200 and 297 is also facilitated via the generation of the pairing passcodes or credentials that can allow the subordinate wireless peripheral device 278 to transmit a passcode or a verification credential of the password to securely pair with each of the plurality of information handling systems 200 and 297 via a secure extended direct GATT communication mode wireless link at secure BLE host addresses specific to those information handling systems 200 and 297. This pairing may not require a predetermined gesture or manual entry or confirmation of a passcode to be performed during pairing with each of the plurality of information handling systems 200 and 297.

Figure 3:
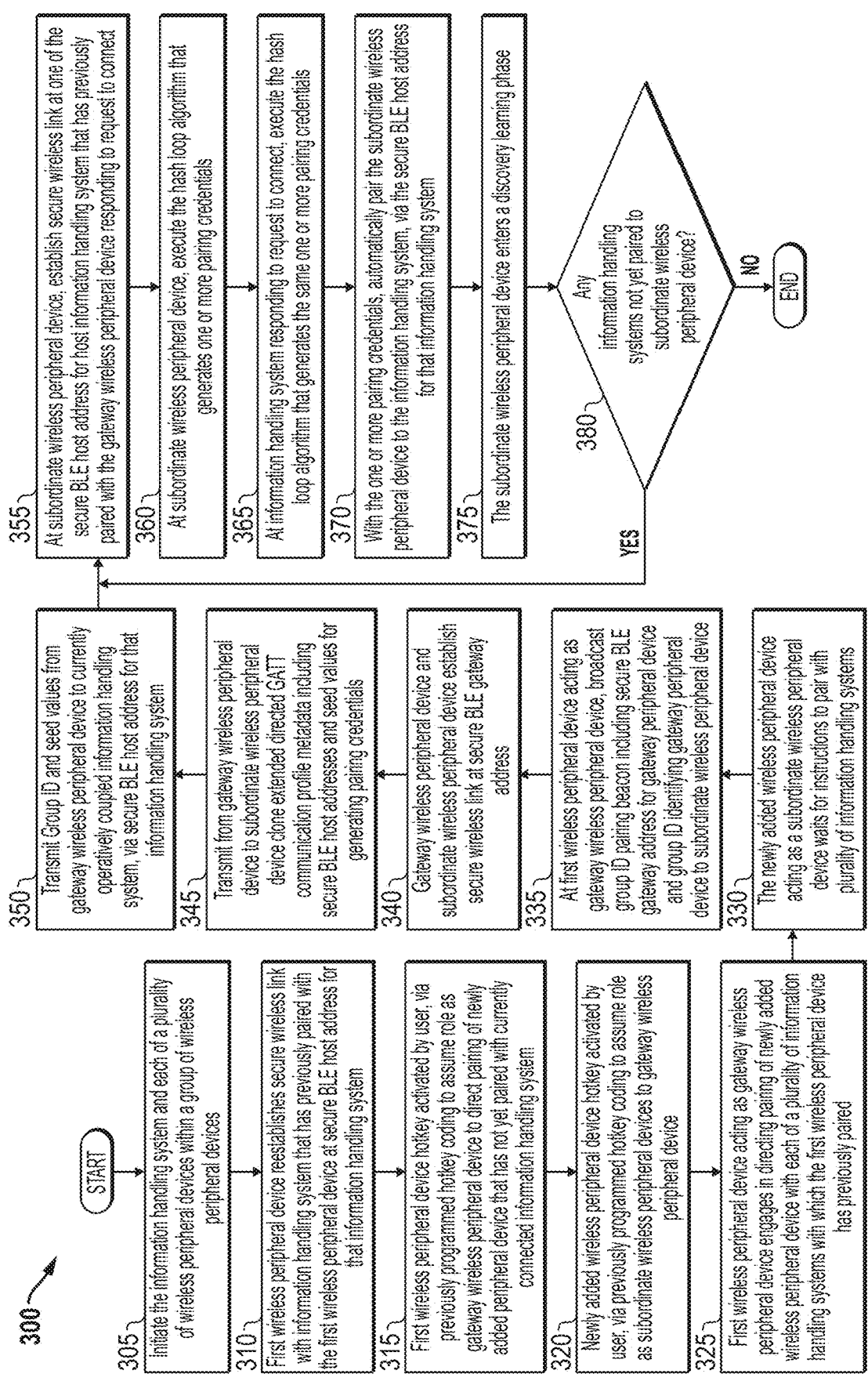
FIG. 3 is a flowchart showing a method of pairing a newly added wireless peripheral device to a plurality of information handling systems that have been previously paired to an existing wireless peripheral device according to another embodiment of the present disclosure.

FIG. 3 is a flowchart showing a method 300 of automatically directing pairing of a newly added wireless peripheral devices to a plurality of information handling systems with which the gateway wireless peripheral device has previously paired according to another embodiment of the present disclosure. The method of automatically directing pairing of a newly added wireless peripheral devices to a plurality of information handling systems includes extending an established trusted relationship between the gateway wireless peripheral device and each of the plurality of information handling systems to the newly added wireless peripheral device in embodiments herein. As described herein, the gateway automated secure pairing system and method for pairing a newly purchased or newly added wireless peripheral device to a plurality of information handling systems in an embodiment may reduce required user participation in pairing processes across the plurality of information handling systems for the newly added wireless peripheral device. The embodiments of the present specification remove requirements of entering pin codes at such newly added wireless peripheral devices, for example, according to embodiments herein. This may occur in an embodiment due to an existing wireless peripheral device that is currently paired with and is in direct communication with one of the plurality of information handling systems at a secure Bluetooth® Low Energy (BLE) host address specific to one of the plurality of previously paired information handling systems. That the existing wireless peripheral device has been previously paired with and is trusted by the host information handling system, based on sharing access of a directed, secured communication with the host information handling system, this trust may be extended to the newly added wireless peripheral device using a secure extended directed generic attribute profile (GATT) communication via a BLE host address specific to the first information handling system provided to the newly added wireless peripheral device. Thus, the existing wireless peripheral device directs and instructs the pairing process between the newly added wireless peripheral device and each of the information handling systems that have been listed as having been previously paired to the existing wireless peripheral device.

At block 305, a first information handling system in an embodiment that has been previously paired with one of a plurality of wireless peripheral devices and each of the plurality of wireless peripheral devices within a group of wireless peripheral devices may be powered on or initiated. This initiation process may include the user activating a power button, switch, or other key that causes each of the wireless peripheral devices and information handling system to be powered on. In an embodiment, by initiating the wireless peripheral devices and the information handling system, power may be provided to a hardware processor of the information handling system and peripheral device microcontrollers of each wireless peripheral devices. By providing power to the peripheral device microcontrollers, the computer-readable program code of a gateway automated secure pairing module may be executed by the peripheral device microcontrollers so that a newly added wireless peripheral device operate to act as a subordinate to a gateway wireless peripheral device that has previously been paired to the information handling system to engage in the automated secure pairing process described herein.

A first wireless peripheral device that has been previously paired with the plurality of information handling systems in an embodiment at block 310 may reestablish a secure wireless link with information handling system that has previously paired with the first wireless peripheral device at a secure BLE host address for that information handling system. This may occur, in an embodiment automatically upon powering up of the first wireless peripheral device within BLE range of the first information handling system, since these two devices have been previously paired.

At block 315, the existing first wireless peripheral device may be hotkey activated by a user, via previously programmed hotkey coding to assume a role as a gateway wireless peripheral device to direct pairing of a newly added wireless peripheral device that has not yet paired with the currently connected information handling system. The first wireless peripheral device currently paired to the information handling system may execute computer-readable program code of a gateway automated wireless pairing module to determine that the existing wireless peripheral device has been hotkey activated by a user providing a specific combination of user inputs to act as a gateway peripheral device to indicate a desire to pair the second wireless peripheral device. The first wireless peripheral device acting as the gateway wireless peripheral device will direct pairing of the newly added subordinate wireless peripheral device with the first information handling system and any other information handling systems with which the first wireless peripheral device, acting as the gateway peripheral device has previously paired.

A newly added wireless peripheral device in an embodiment at block 320 may be hotkey activated by a user in some embodiments, via previously programmed hotkey coding, to assume a role as a subordinate wireless peripheral device to the gateway wireless peripheral device. The not yet paired newly added wireless peripheral device may execute computer-readable program code of a gateway automated wireless pairing agent to determine that the newly added wireless peripheral device has been hotkey activated by a user providing another specific combination of user inputs to act as a subordinate wireless peripheral device to the gateway peripheral device to receive pairing instructions for pairing with the plurality of information handling systems. In other embodiments, the newly added wireless peripheral device may automatically assume a subordinate role upon startup for a first time.

At block 325, the first wireless peripheral device acting as gateway wireless peripheral device engages in directing pairing of newly added wireless peripheral device with each of a plurality of information handling systems with which the first wireless peripheral device has previously paired. The existing first wireless peripheral device in an embodiment activate the first wireless peripheral device microcontroller to execute computer-readable program code of the gateway automated wireless pairing module to prepare to clone extended directed GATT communication profile metadata of the existing first wireless peripheral device for use with the newly added and not yet paired second wireless peripheral device. Such clone extended directed GATT communication profile metadata may include a passcode seed, BLE host address for pairing with the first information handling system, a group ID that identifies both the existing first wireless peripheral device and the newly added second wireless peripheral device as part of a recognized group of peripheral devices that may be identified for a user, and device ownership data of ownership of the existing first wireless peripheral device, in an embodiment.

In an embodiment at block 330, the newly added wireless peripheral device acting as a subordinate wireless peripheral device waits for instructions to pair with plurality of information handling systems. The newly added wireless peripheral device not yet paired to the information handling systems may assume a role as a subordinate wireless peripheral device to the gateway peripheral device to await receipt of pairing credentials, keys, passcodes, or other pairing requirements and instructions from the existing wireless peripheral device acting as the gateway device for pairing with the information handling systems.

At block 335, the first wireless peripheral device acting as gateway wireless peripheral device may broadcast a group ID pairing beacon, including a secure BLE gateway address for the gateway peripheral device and a group ID identifying the gateway peripheral device, to the subordinate second wireless peripheral device. In an embodiment, for all peripheral devices within a group of peripheral devices that are to be paired with each of the information handling systems to which the first wireless peripheral device has been previously paired, this common peripheral device group ID may be stored on respective wireless peripheral device storage devices. The group ID pairing beacon in an embodiment may further include a secure BLE gateway address specific to the first wireless peripheral device acting as the gateway peripheral device for secure communication of clone extended directed GATT communication profile metadata from the first wireless peripheral device acting as the gateway wireless peripheral device directed only to the second wireless peripheral device acting as the subordinate wireless peripheral device. Upon receipt of the clone extended directed GATT communication profile metadata at the second wireless peripheral device acting as the subordinate, the second wireless peripheral device may have all instructions and information necessary to perform pairing with additional information handling systems in embodiments herein. No extra assistance of the first wireless peripheral device acting as the gateway wireless peripheral device is required further for pairing between the second wireless peripheral device and a first information handling system or other information handling systems listed.

The gateway wireless peripheral device in an embodiment at block 340 and the subordinate wireless peripheral device may establish a secure wireless link at the secure BLE gateway address. Such a secure BLE gateway address secure wireless link may allow for secure communication of clone extended directed GATT communication profile metadata including data, such as BLE host addresses and seed values, from the first wireless peripheral device acting as the gateway wireless peripheral device to the second wireless peripheral device acting as the subordinate wireless peripheral device.

At block 345 in an embodiment, clone extended directed GATT communication profile metadata, including secure BLE host addresses and seed values for generating pairing credentials, may be transmitted from the gateway wireless peripheral device to the subordinate wireless peripheral device, via the secure wireless link established at block 340. The clone extended directed GATT communication profile metadata may be provided from the existing first wireless peripheral device to the newly added second wireless peripheral device via GATT communication and with a GATT copy process to the newly added second wireless peripheral device. This clone extended directed GATT communication profile metadata may extend the trust of the gateway wireless peripheral device to the subordinate wireless peripheral device due to the inclusion of the BLE host addresses, Group ID including both wireless peripheral devices, common ownership metadata, or other data indicating to the host information handling system that pairing may be trusted with a link established at the BLE host address for that host information handling system. Further, the seed data provided to both the host information handling system and the subordinate wireless peripheral device provides for an ability to expedite pairing via the secure extended directed GATT communication between the subordinate wireless peripheral device and the host information handing system.

The gateway wireless peripheral device in an embodiment at block 350 may transmit the Group ID and seed values to the currently operatively coupled first information handling system, via the secure BLE host address for that information handling system in an embodiment. This may be performed so that the trusted gateway wireless peripheral device can notify the first wireless information handling system that it is instructing another subordinate wireless peripheral device having the same Group ID as the gateway wireless peripheral device to pair with the first information handling system. The gateway wireless peripheral device may further transmit the same seed values to the first information handling system that were transmitted at block 345 to the subordinate wireless peripheral device such that both of these devices can generate matching passcode keys or other pairing credentials to confirm that each is a trusted device for pairing.

At block 355, the subordinate wireless peripheral device may establish a secure wireless link at one of the secure BLE host addresses for a first information handling system that has previously paired with the gateway wireless peripheral device responding to request to connect in an embodiment. The subordinate wireless peripheral device may transmit a pairing request to only information handling systems for which it has received secure BLE host addresses above at block 345, via a secure extended direct GATT communication mode at the secure BLE host address for the first host information handling system, and later any other host information handling system within a plurality of information handling systems. Such a request to connect may also include the Group ID and ownership information received within the clone extended directed GATT communication profile metadata at the subordinate wireless peripheral device at block 345. Such a Group ID and ownership information matching that of the gateway wireless peripheral device in an embodiment, as received at the secure BLE host address specific to that information handling system may allow the first host information handling system to establish the same level of trust with the subordinate wireless peripheral device as currently exists with the gateway wireless peripheral device that it has previously paired with. Further, the gateway wireless peripheral device may also be in current secure communication with the first host information handling system in some embodiments. Upon approval of such a request, the subordinate wireless peripheral device may establish a secure wireless link at the secure BLE host address for the first information handling system.

In an embodiment at blocks 360 and 365, the subordinate wireless peripheral device and the first information handling system may execute the hash loop algorithm that generates one or more pairing credentials. The subordinate wireless peripheral device in an embodiment and the first information handling system may independently generate identical pairing passcodes or credentials using the received seed values. These generated secure passcodes may be later used by the subordinate wireless peripheral device, at the direction of the gateway wireless peripheral device, to automatically pair the subordinate wireless peripheral device to the first information handling system. In an embodiment, both a hardware processor of the first information handling system and the subordinate wireless peripheral device microcontroller may concurrently execute a hash loop algorithm or function that generates the secure passcode such as at blocks 360 and 365. Because the subordinate wireless peripheral device microcontroller is to generate the same secure passcode as that generated by the first information handling system, the hash loop algorithm may be the same as those used by the first information handling system to generate the secure passcode.

The subordinate wireless peripheral device in an embodiment at block 370 may be automatically paired to the information handling system with the one or more pairing credentials, via the secure BLE host address for the first information handling system. The newly added subordinate wireless peripheral device or the first host information handling system will conduct verification of pairing credentials, keys, passcodes, or other pairing requirements and instructions from the seed value provided by the existing gateway wireless peripheral device to pair with the first host information handling system using the secure BLE host address for the first host information handling system. In this way, the pairing communication is secure from any other nearby potential host information handling systems from interfering because the secure BLE host address is used.

At block 375 in an embodiment, the subordinate wireless peripheral device may enter into a discovery learning phase to search for additional host information handling systems within BLE wireless range that may have been previously paired to the gateway wireless peripheral device.

It may be determined in an embodiment at block 380 whether any information handling systems for which the subordinate wireless peripheral device has received secure BLE host addresses at block 345 have not yet paired to subordinate wireless peripheral device. The subordinate wireless peripheral device may enter a discovery learning phase when the previous pairing with the first host information handling system is complete. If the subordinate wireless peripheral device has not yet paired with any one of the information handling systems within this list, this may indicate that the subordinate wireless peripheral device has not yet completed pairing with that host information handling system. This may also indicate a need to attempt to establish contact with such a second host information handling system, as the subordinate wireless peripheral device may be within BLE range of such an information handling system.

If it is determined that the subordinate wireless peripheral device has been paired to all of the information handling systems for which it has received a secure BLE host address at block 345, the subordinate wireless peripheral device may have already paired to each of the information handling systems that have previously paired with the gateway wireless peripheral device. The subordinate wireless peripheral device may exit the discovery learning phrase and the method may end.

If it is determined that the subordinate wireless peripheral device has not yet been paired to one of the information handling systems for which it has received a secure BLE host address at block 345, the method may proceed back to 355 for potential pairing with another host information handling system for which the subordinate wireless peripheral device has received a secure BLE host address, but with which it has yet to pair.

For example, upon the second wireless peripheral device coming within BLE range of a second information handling system, the subordinate second wireless peripheral device may transmit the same seed values transmitted at block 345 to the second host information handling system via the secure communication at the BLE host address specific to the second host information handling system, also transmitted at block 345. These seed values may be used in an embodiment at the second host information handling system for generation of matching pairing credentials, keys, or passcodes to those generated at the subordinate wireless peripheral device. Upon successful pairing to the second host information handling system, this process may be repeated with other information handling systems to which the gateway peripheral device has been previously paired until the subordinate wireless peripheral device has paired with each of the information handling systems to which the gateway peripheral device has previously paired. In such a way, the gateway wireless peripheral device may direct secure automatic pairing of the subordinate pairing peripheral device to each of the host information handling systems to which the gateway peripheral device has previously paired while minimizing or negating user participation or input in these processes.

The blocks of the flow diagrams of FIGS. 2A, 2B and 3 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A gateway peripheral device operatively couplable to a plurality of information handling systems comprising:
    a peripheral device hardware microcontroller;
    a peripheral device storage device for storing a plurality of Bluetooth® Low Energy (BLE) host addresses for a first of the plurality of information handling systems with which the gateway peripheral device has previously paired;
    a peripheral device wireless radio to establish a wireless link to a first of the plurality of information handling systems to which the gateway peripheral device has previously paired; and
    the peripheral device hardware microcontroller to execute code instructions of a gateway automated wireless pairing module to receive a hotkey activation of the gateway wireless peripheral device to indicate commencement of the role of the gateway peripheral device to coordinate trusted pairing of a subordinate wireless peripheral device to each of the plurality of information handling systems and to copy clone extended directed generic attribute (GATT) communication profile metadata for the gateway peripheral device for use by the subordinate wireless peripheral device to pair with the first of the plurality of information handling systems, where the clone extended directed GATT communication profile metadata includes a BLE host address of the first of the plurality of information handling systems;
    the peripheral device hardware wireless radio to transmit to the subordinate wireless peripheral device, via GATT communication, the clone extended directed GATT communication profile metadata including the BLE host address of the first of the plurality of information handling systems; and
    the peripheral device hardware wireless radio to transmit to the subordinate wireless peripheral device instructions for the subordinate wireless peripheral device to pair with the first of the plurality of information handling systems, via extended directed GATT communication mode established using the BLE host address for the first of the plurality of information handling systems.

2. The gateway peripheral device of claim 1 further comprising:
    the peripheral device hardware wireless radio to transmit to the subordinate wireless peripheral device as part of the clone extended directed GATT communication profile metadata a group ID pairing beacon including a common group ID stored in the peripheral device storage device of the gateway peripheral device for identifying the gateway peripheral device and the subordinate wireless peripheral device as part of a defined and trusted group.

3. The gateway peripheral device of claim 1 further comprising:
    the peripheral device hardware wireless radio to transmit to the subordinate wireless peripheral device as part of the clone extended directed GATT communication profile metadata a passcode seed value for generating a pairing passcode at the subordinate wireless peripheral device for pairing with the first of the plurality of information handling systems using an extended directed GATT communication at the BLE host address and to satisfy the BLE protocol pairing passcode security requirements.

4. The gateway peripheral device of claim 1, wherein the clone extended directed GATT communication profile metadata includes a passcode seed, the BLE host address for pairing with the first information handling system, a group ID that identifies both the gateway peripheral device and the subordinate wireless peripheral device as part of a recognized group of peripheral devices that may be identified for ownership by the same user with device ownership data to extend the trust of the gateway peripheral device to the subordinate wireless peripheral device for pairing.

5. The gateway peripheral device of claim 1 further comprising:
the peripheral device hardware wireless radio to transmit to the subordinate wireless peripheral device, via GATT communication, the clone extended directed GATT communication profile metadata including a plurality of BLE host addresses for each of the plurality of information handling systems with which the gateway peripheral device has previously paired; and
the peripheral device hardware wireless radio to transmit to the subordinate wireless peripheral device instructions for the subordinate wireless peripheral device to pair with each of the plurality of information handling systems at a respective BLE host address in the BLE host addresses upon powering on until the subordinate wireless peripheral device has paired with each of the plurality of information handling systems.

6. The gateway peripheral device of claim 1 further comprising:
the peripheral device hardware wireless radio to transmit to the subordinate wireless peripheral device and to the first of the plurality of information handling systems, via an extended directed GATT communication mode, one or more seed values for generation of pairing passcode credentials to enable simultaneous passcode generation for pairing the first of the plurality of information handling systems with the subordinate wireless peripheral device.

7. The peripheral device of claim 1, wherein the gateway peripheral device is a mouse and the hotkey activation comprises one or more of a keypress for one or more user interface buttons, scrolling of a scroll wheel, pressing of a scroll wheel, or specific movement of the peripheral device.

8. A method for automatically and securely pairing a subordinate wireless peripheral device to a first information handling system within a plurality of information handling systems using a trusted gateway peripheral device comprising:
executing computer-readable program code of a gateway automated wireless pairing agent, via a subordinate wireless peripheral device hardware microcontroller, to receive a clone extended directed generic attribute (GATT) communication profile metadata, via a subordinate wireless peripheral device wireless radio, from a trusted gateway peripheral device including a plurality of Bluetooth® Low Energy (BLE) host addresses, each for one of the plurality of information handling systems with which the trusted gateway peripheral device has previously paired;
storing the clone extended directed GATT communication profile metadata at a subordinate wireless peripheral device storage device;
establishing an extended direct GATT communication at a secure first BLE host address with a first of the plurality of information handling systems selected from the plurality of BLE host addresses received for each of the plurality of information handling systems and using one or more seed values received as part of the clone extended directed GATT communication profile metadata for generation of a pairing passcode;
executing code instructions, via the subordinate wireless peripheral device hardware microcontroller, to pair with the first of the plurality of information handling systems via the first BLE host address for the first of the plurality of information handling systems, via the subordinate wireless peripheral device hardware wireless radio, in an extended directed GATT communication mode, by verification of generated pairing passcodes at both the subordinate wireless peripheral device and the first of the plurality of information handling systems.

9. The method of claim 8 further comprising:
executing computer-readable program code of the gateway automated wireless pairing agent, via the subordinate wireless peripheral device hardware microcontroller, to receive a hotkey activation at the subordinate wireless peripheral device to initiate a pairing of the subordinate wireless peripheral device to each of the plurality of information handling systems with which the trusted gateway peripheral device has previously paired.

10. The method of claim 8 further comprising:
receiving from the trusted gateway peripheral device, via the peripheral device hardware wireless radio, a group ID pairing beacon including a common group ID as part of the clone extended directed GATT communication profile metadata for identifying the subordinate wireless peripheral device as part of a commonly-owned, established group of peripheral devices with the trusted gateway peripheral device to extend trust using the secure first BLE host address to pair with the first of the plurality of information handling systems that previously paired with the trusted gateway peripheral device.

11. The method of claim 8 further comprising:
executing computer readable code instructions of a hash loop algorithm, via the subordinate wireless peripheral device hardware microcontroller, using received seed values in the clone extended directed GATT communication profile metadata with advance encryption algorithms and a SHA256 hybrid algorithm to generate the pairing passcodes for pairing with the first of the plurality of information handling systems.

12. The method of claim 8, wherein the clone extended directed GATT communication profile metadata includes the one or more passcode seed values, the BLE host addresses for pairing with the plurality of information handling systems, a group ID that identifies both the trusted gateway peripheral device and the subordinate wireless peripheral device as part of a recognized group of peripheral devices that may be identified for ownership by the same user to extend the trust of the trusted gateway peripheral device to the subordinate wireless peripheral device for pairing.

13. The method of claim 8, wherein the subordinate wireless peripheral device receives the clone extended directed GATT communication profile metadata via a GATT simple copy process on a secured GATT BLE wireless link with the trusted gateway peripheral device.

14. The method of claim 8 further comprising:
- executing code instructions, via the subordinate wireless peripheral device hardware microcontroller, to generate a second pairing passcode using the one or more seed values; and
- pairing with a second of the plurality of information handling systems at a second BLE host address of the plurality of BLE host addresses for the second of the plurality of information handling systems, via the subordinate wireless peripheral device hardware wireless radio, with verification of the second pairing passcode using the extended directed GATT communication mode with the second of the plurality of information handling systems.

15. A subordinate wireless peripheral device operatively couplable to a plurality of information handling systems comprising:
- a subordinate wireless peripheral device hardware microcontroller executing computer-readable program code of a gateway automated wireless pairing agent to receive a clone extended directed generic attribute (GATT) communication profile metadata, via a subordinate wireless peripheral device wireless radio, from a trusted gateway peripheral device including a plurality of Bluetooth® Low Energy (BLE) host addresses, each for one of the plurality of information handling systems with which the trusted gateway peripheral device has previously paired;
- a subordinate wireless peripheral device storage device for storing the clone extended directed GATT communication profile metadata including the plurality of BLE host addresses;
- the subordinate wireless peripheral device wireless radio to establish an extended direct communication at a secure first BLE host address with a first of the plurality of information handling systems selected from the plurality of BLE host addresses received for each of the plurality of information handling systems and use one or more seed values received as part of the clone extended directed GATT communication profile metadata for generation of a pairing passcode; and
- the subordinate wireless peripheral device hardware microcontroller executing code instructions to pair with the first of the plurality of information handling systems via the secure first BLE host address for the first of the plurality of information handling systems by verification of the generated pairing passcode at both the subordinate wireless peripheral device and the first of the plurality of information handling systems.

16. The subordinate wireless peripheral device of claim 15 further comprising:
- the subordinate wireless peripheral device hardware device controller executing computer-readable program code of the gateway automated wireless pairing agent to receive a hotkey activation at the subordinate wireless peripheral device to initiate a pairing of the subordinate wireless peripheral device to each of the plurality of information handling systems with which the trusted gateway peripheral device has previously paired.

17. The subordinate wireless peripheral device of claim 16, wherein the peripheral device is a keyboard and the hot key activation includes keypress of one or more keys on the keyboard.

18. The subordinate wireless peripheral device of claim 15 further comprising:
- the peripheral device hardware wireless radio to receive from the trusted gateway peripheral device a group ID pairing beacon including a common group ID as part of the clone extended directed GATT communication profile metadata for identifying the subordinate wireless peripheral device as part of a commonly-owned, established group of peripheral devices with the trusted gateway peripheral device to extend trust using the secure BLE host address to pair with the first of the plurality of information handling systems previously paired with the trusted gateway peripheral device.

19. The subordinate wireless peripheral device of claim 15 further comprising:
- the subordinate wireless peripheral device hardware device controller to execute computer-readable program code of the gateway automated wireless pairing agent for the subordinate wireless peripheral device to pair with each of the plurality of information handling systems via the plurality of BLE host addresses received in the clone extended directed GATT communication profile metadata upon powering on until the subordinate wireless peripheral device has paired with each of the plurality of information handling systems.

20. The subordinate wireless peripheral device of claim 15, wherein the subordinate wireless peripheral device receives the clone extended directed GATT communication profile metadata via a GATT simple copy process on a secured GATT BLE wireless link with the trusted gateway peripheral device.

* * * * *